US008915401B2

(12) United States Patent
Lüchinger

(10) Patent No.: US 8,915,401 B2
(45) Date of Patent: Dec. 23, 2014

(54) DOSAGE-DISPENSING DEVICE

(75) Inventor: Paul Lüchinger, Uster (CH)

(73) Assignee: Mettler-Toledo AG, Greifensee (CH)

( * ) Notice: Subject to any disclaimer, the term of this patent is extended or adjusted under 35 U.S.C. 154(b) by 366 days.

(21) Appl. No.: 13/298,626

(22) Filed: Nov. 17, 2011

(65) Prior Publication Data

US 2012/0132317 A1 May 31, 2012

(30) Foreign Application Priority Data

Nov. 26, 2010 (EP) .................................. 10192661

(51) Int. Cl.
| | | |
|---|---|---|
| *B65B 1/06* | (2006.01) | |
| *G01F 13/00* | (2006.01) | |
| *B65B 1/08* | (2006.01) | |
| *G01G 13/02* | (2006.01) | |
| *G01G 17/06* | (2006.01) | |

(52) U.S. Cl.
CPC ................ *G01F 13/001* (2013.01); *B65B 1/06* (2013.01); *B65B 1/08* (2013.01); *G01G 13/02* (2013.01); *G01G 17/06* (2013.01)
USPC ........... 222/166; 222/161; 222/164; 222/167; 222/561

(58) Field of Classification Search
CPC ........... B65B 1/06; B65B 1/08; G01F 13/001; G01G 13/02; G01G 13/024; G01G 13/245; G01N 2035/00207
USPC .......... 222/160, 161, 164, 166–168, 559, 561
See application file for complete search history.

(56) References Cited

U.S. PATENT DOCUMENTS

| | | | |
|---|---|---|---|
| 1,467,802 A | | 9/1923 | Mainland |
| 2,089,526 A | * | 8/1937 | Andreas ........................... 177/14 |
| 2,112,977 A | * | 4/1938 | Vredenburg ..................... 177/95 |
| 2,257,412 A | * | 9/1941 | Chandler ....................... 222/164 |
| 2,830,782 A | * | 4/1958 | Solberg ........................ 248/141 |
| 3,261,508 A | * | 7/1966 | Wahl ............................. 222/199 |
| 7,156,267 B2 | * | 1/2007 | Zanga ........................... 222/504 |
| 7,284,574 B2 | | 10/2007 | Fontaine et al. |
| 7,665,633 B2 | | 2/2010 | MacMichael et al. |
| 7,770,761 B2 | | 8/2010 | Lüchinger et al. |
| 7,922,043 B2 | | 4/2011 | Luechinger |
| 7,922,044 B2 | | 4/2011 | Lüchinger |
| 8,448,826 B2 | * | 5/2013 | Luchinger et al. ............ 222/507 |
| 2008/0190513 A1 | | 8/2008 | Luechinger et al. |
| 2008/0283555 A1 | | 11/2008 | Luechinger et al. |
| 2009/0159153 A1 | | 6/2009 | Luechinger |

FOREIGN PATENT DOCUMENTS

| | | |
|---|---|---|
| BE | 507045 | 11/1951 |
| DE | 1012250 | 7/1957 |
| GB | 2440443 A | 1/2008 |

* cited by examiner

*Primary Examiner* — J. Casimer Jacyna
(74) *Attorney, Agent, or Firm* — Standley Law Group LLP

(57) ABSTRACT

A dosage-dispensing unit with an interior space, delimited by a lateral wall and a bottom portion. The bottom portion further includes an outlet orifice. The dosage-dispensing unit can be connected to a holder device of a dosage-dispensing device. The holder device is supported by constraints that allow movement in a prescribed direction. The outlet orifice has a central longitudinal axis that is oriented at a predetermined angle relative to this prescribed direction of movement. The internal surface of the bottom portion facing towards the interior space includes a surface region having at least a line segment that starts at the outlet orifice and extends in the prescribed direction of movement.

16 Claims, 6 Drawing Sheets

DOSAGE-DISPENSING DEVICE

CROSS-REFERENCE TO RELATED APPLICATIONS

This application is entitled to benefit of a right of priority under 35 USC §119 from European patent application EP 10192661.6, which was filed on 26 Nov. 2010, and the content of which is incorporated by reference as if fully recited herein.

TECHNICAL FIELD

The disclosed embodiments relate to a dosage-dispensing device with a holder device that is supported by constraints allowing movement in a prescribed direction, and it further concerns a dosage-dispensing unit that is matched to the dosage-dispensing device and designed so that it can be set into the holder device.

BACKGROUND

Dosage-dispensing devices for free-flowing substances, for example powders, pastes or liquids, are used in many areas of industry. These dosage-dispensing devices are preferably equipped with a drive mechanism, a controller, and a measuring device to measure the amount of material dispensed. The free-flowing substance, i.e. the material to be dispensed, can be supplied to the dosage-dispensing device either through a feeder conduit or by means of an exchangeable dosage-dispensing unit. To allow the dosage-dispensing unit to be set into the dosage-dispensing device, the latter needs to be equipped with a holder device.

A dosage-dispensing unit is essentially composed of a source container which holds the dosage material and a dispensing head which closes off the container. The dispensing head has an outlet orifice and a shutter element, by means of which the outlet orifice can be closed to a variable degree. In place of the source container, the dispensing head can also be supplied with dosage material by a conveyor device, for example a feeder hose.

A dosage-dispensing device with a holder device for a dosage-dispensing unit of the aforementioned kind is disclosed in commonly-owned and co-pending US published application 2008/0190513. The holder device of this dosage-dispensing device is pivotally supported on a horizontal axis. Oscillatory pivoting movements of the holder device can be generated by means of an impact mechanism, whereby dosage material in powder form inside the dosage-dispensing unit is loosened up. The pivoting movements further have the effect of breaking up material bridges in the powder material, which impede the free flow of dosage material to the outlet orifice. Material bridges are formed when individual powder particles become mutually locked into an arc-shaped barrier and thus stop the continuous stream of dosage material to the outlet orifice.

Oscillatory pivoting movements produced excellent results in dosage materials in power form with granules of any shape and with low moisture content. The dosage material contained in the dosage-dispensing unit, which has been solidified due to long-time storage, transport vibrations or moisture absorption, can be brought back into a significantly more free-flowing condition by the pivoting movements. This is due to the fact that the dosage material is tossed up inside the source container, whereby the dosage material is turned into a loose aggregate.

However, experiments have shown that in spite of the loosening-up, the dosage material clings to the interior wall of the dispensing head, particularly in the area of the outlet orifice. This can become an obstacle to the dosage-dispensing process.

There is, therefore, an objective to create a dosage-dispensing unit in which as little as possible of the dosage material remains stuck to the inside wall of the dispensing head.

SUMMARY

The task is solved with a dosage-dispensing unit and a dosage-dispensing device having the features defined in the independent patent claims.

A dosage-dispensing unit solving the task has an interior space that is delimited by a lateral wall and a bottom portion. The bottom portion further includes an outlet orifice. The dosage-dispensing unit can be connected to a holder device of a dosage-dispensing device. The holder device is supported by constraints that allow movement in a prescribed direction. The central longitudinal axis of the outlet orifice is oriented at a predetermined angle relative to the prescribed direction of movement. The internal surface of the bottom portion facing towards the interior space includes a surface region comprising at least a line segment that starts at the outlet orifice and extends in the prescribed direction of movement.

The inventive concept where the design of the bottom portion depends on the direction of movement has the effect that the shear forces which, as a result of movements of the holder device, occur between the interior wall and the dosage material clinging to it are maximized in the surface region that comprises at least a line segment. Furthermore, the arrangement wherein the central longitudinal axis of the outlet orifice is oriented at a predetermined angle to the direction of movement is very effective in causing the dosage material—after it has been broken loose from the interior wall by the shear forces—to slide out of the dosage-dispensing unit through the outlet orifice. The predetermined angle, measured between the contour section and the central longitudinal axis, is smaller than 90°.

In a first embodiment of the dosage-dispensing device, the movement in the prescribed direction can be a pivoting movement of the holder device about a horizontal pivot axis. Accordingly, the surface region comprising at least a line segment has to be a circular arc extending from the central longitudinal axis of the outlet orifice towards the sidewall. The center of the circular arc lies at a perpendicular distance from the central longitudinal axis of the outlet orifice and is arranged in such a way that when the dosage-dispensing unit is connected to the holder device, the center of the arc lies on the pivot axis of the holder device. This can be achieved in practice by a design where the holder device is equipped with coupling means for at least one dosage-dispensing unit, wherein the coupling means ensure that the spatial relationship of the installed dosage-dispensing unit to the pivot axis can be set and/or held in the intended manner. It is even simpler to use a specifically defined coupling means to which the geometric data of the dosage-dispensing unit are matched.

The magnitude of the curvature radius of the circular arc thus equals the radius of the pivoting movement. Due to the fact that the pivot axis is arranged at a distance from the central longitudinal axis of the outlet orifice, the movement is directed at a predetermined angle to the central longitudinal axis of the outlet orifice. Due to the arcuate shape, the direction of movement at the predetermined angle is tangent to the circular arc and logically varies with the distance of a point on the arc from the outlet orifice. The farther away the point on the arc is selected from the outlet orifice, the narrower the predetermined angle will be.

The inventive design of the bottom portion according to the first embodiment has the effect that the shear forces which, as a result of pivoting movements of the holder device, occur between the interior wall and the dosage material clinging to it can be maximized in the surface region of the arcuate line segment. Experiments with several dosage materials of the most diverse properties have led to the conclusion that, with the inventive design of the internal surface, the dosage material can be efficiently separated from the interior wall by the oscillatory pivoting movements and moved to the outlet orifice.

Of course, it is permissible for the curvature radius to slightly deviate from the radius of the pivoting movements. A good separation of coagulating dosage materials was still achieved if the curvature radius differed by no more than ±10% from the radius of the pivoting movement.

In a second embodiment, the movement in the predetermined direction is a linear movement of the holder device. The surface region comprises at least a line segment that is a straight line segment extending from the central longitudinal axis of the outlet orifice towards the sidewall.

Adjoining the line-segment surface region in both embodiments, the bottom portion can have a continuous surface profile. To achieve a continuous surface profile, the inside wall can for example have a rotationally symmetric shape relative to the outlet orifice, which means a funnel-shaped, curved or cone-shaped inside wall.

Dependent on the desired properties, the line-segment surface region of the bottom portion can also be adjoined by a discontinuous surface profile. This has the result that the largest shear forces occur in the line-segment surface region and that the dosage material that is present in this surface portion is moved to the outlet orifice.

Obviously, there can be at least two outlet orifices formed in the bottom portion of a dosage-dispensing unit, wherein the bottom portion has an arcuate profile adjoining each of the outlet orifices and wherein the outlet orifices are arranged on a line that runs parallel to the pivot axis.

The outlet orifice preferably has a sharp-edged rim. Particularly with substances that come out of the orifice as a continuous bead, a sharp-edged rim is better at cutting the string of substance as the latter, due to its inertia, is chopped into segments by the sharp-edged rim.

The aperture cross-section of the outlet orifice can further have any desired shape, but the preferred choices are triangular, square or round.

Furthermore, different shutter elements can be used in the dosage-dispensing unit. For example, a shutter can close and open the aperture of the outlet orifice to a variable degree. The shutter can likewise have a sharp cutting edge which leads to a better separation of the string of substance, as the latter, due to its inertia, is chopped into segments by the cutting edge.

Preferably, the shutter is arranged to be slidable in a direction perpendicular to the central longitudinal axis of the outlet orifice and has a straight, sickle-shaped or V-shaped shutter edge or a triangular, square or round passage opening.

Instead of a slide shutter, another possibility to close and open the aperture of the outlet orifice to a variable degree consists of a closure element designed to be advanced and retracted in a linear movement along the central longitudinal axis of the outlet orifice.

As a prerequisite for using a dosage-dispensing unit in which the interior contours are adapted to the agitating movements, there needs to be a dosage-dispensing device with a correspondingly configured movable holder device to receive a dosage-dispensing unit. As explained hereinabove, the holder device can be designed for pivoting or linear movement, depending on the interior contour shape of the dosage-dispensing unit.

The dosage-dispensing unit further includes an impact mechanism designed to generate oscillating movements of the holder device in the prescribed direction of movement. The rapid sequence of very short movements leads to a separation of the dosage material in the boundary area to the internal wall of the dosage-dispensing head and prevents the dosage-particles from reattaching themselves to the internal wall. Depending on the configuration of the impact mechanism and the movably supported holder device, the amplitudes of the movements are so small that they are more comparable to shock waves. Of course, the surface of the bottom portion towards the outlet orifice can be designed to include special means for the unidirectional advancement of the dosage material. These means can include a fish-scaled structure, grooves with a sawtooth profile, bristles that oppose themselves to a specific direction of movement, non-stick coatings and the like.

The holder device can further be designed to turn on a horizontal axis of rotation. This arrangement allows a dosage-dispensing unit to be turned upside down. This has the advantage that the holder device can be turned into a defined loading position which facilitates the operation of setting the dosage-dispensing unit into the holder device. Additionally, the dosage material can be mixed and loosened by the turning movement. As soon as the dispensing process is completed, the turning-over into the loading position has the effect that all of the dosage material falls back into the source container. The person in attendance or a loading device can subsequently remove the dosage-dispensing unit from the holder device and put it in storage in the same orientation. While the dosage-dispensing unit is in storage, the dosage material is kept away from the outlet orifice. Even if the dosage material has a tendency towards coagulation or sedimentation, the substance lumps together in the bottom area of the source container and does not clog up the outlet orifice.

BRIEF DESCRIPTION OF THE DRAWINGS

Details of the dosage-dispensing device are described hereinafter with examples of embodiments that are presented in the drawings, wherein identical parts are identified with identical part numbers and wherein.

DETAILED DESCRIPTION

Figure 1:
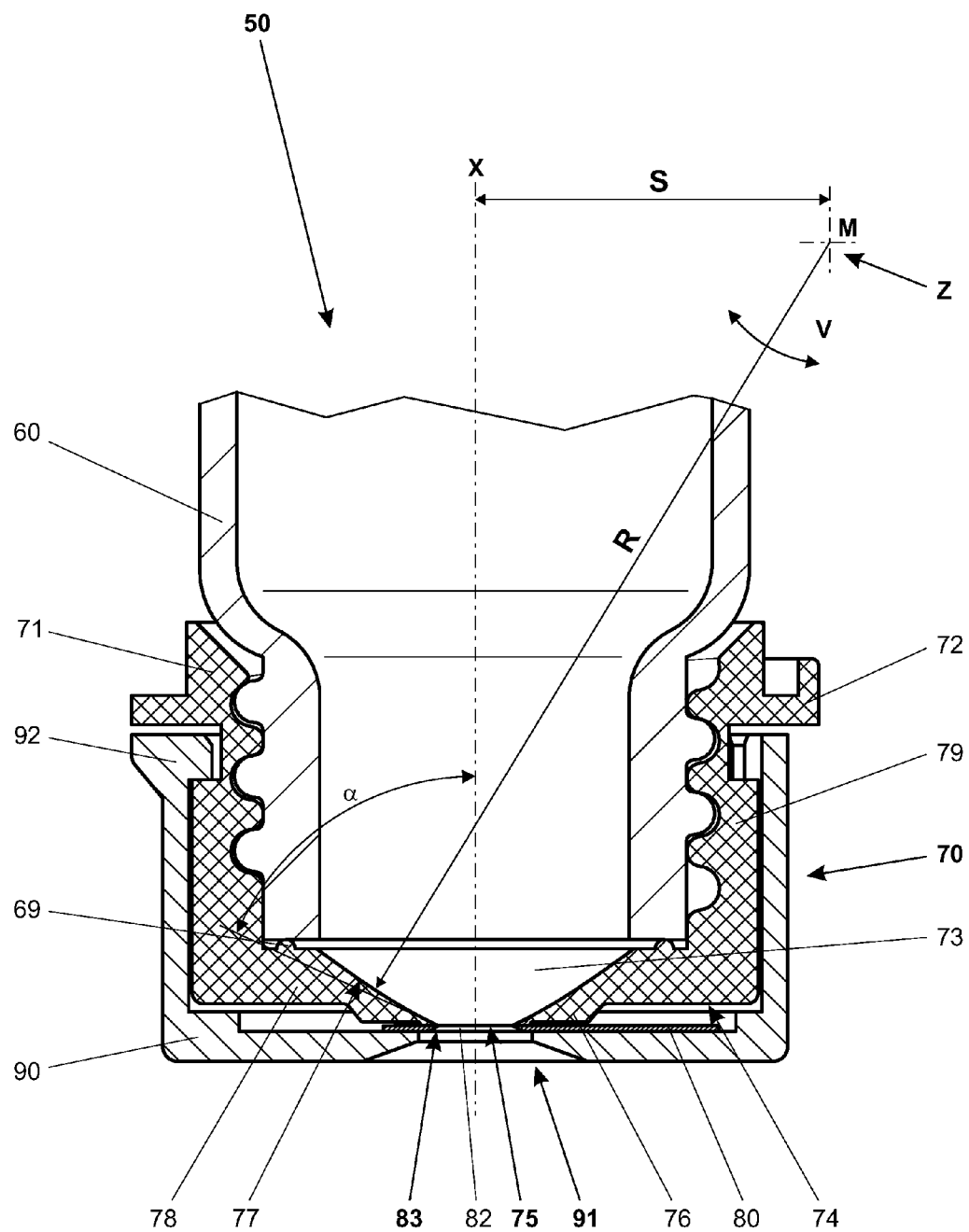
FIG. 1 is a sectional elevation drawing of a dosage-dispensing unit that includes a source container and a dispensing head, as well as a pivoting axis of a holder device (not shown in FIG. 1), which coincides with the center of a circular arc.

FIG. 1 shows a dosage-dispensing unit 50 with a dispensing head 70 in a sectional elevation drawing. The dosage-dispensing unit 50 is shown in operating position, i.e. in the position in which the source container 60 is connected to the dispensing head 70 and dosage material can be dispensed. In order to allow dosage material to flow out of the dispensing head 70, the dosage-dispensing unit 50 has to be turned upside down as shown in the drawing so that, in relation to the direction of gravity, the dispensing head 70 is at the bottom and the source container 60 is at the top. The dispensing head 70 has a main body 71, to which the source container 60 is releasably connected. The place of the source container 60 can also be taken by a closure lid, so that a filled and ready-to-use dispensing head 70 contains at the same time the supply of dosage material. It is further possible to connect other conveyor devices to the main body 71, for example a funnel, a tank, a silo or a feeder hose. The main body 71 further includes a first torque-transmitting means 72. Of course, the first torque-transmitting means 72 is not absolutely required to have the projection shown in FIG. 1 in order to provide a form-locking engagement with a first unit (not shown in FIG. 1). The main body 71 can also have a first means 72 in the form of a clamping surface which can be connected to the first surface through a force-based engagement, for example with a clamping jaw or a collet device. The main body 71 is almost completely surrounded by a cup-shaped actuating member 90 which is connected to the main body 71 with the freedom to rotate about the central longitudinal axis X. The actuating member 90 has in its end surface a window opening 91 and also includes a second torque-transmitting means 92. Arranged between the main body 71 and the actuating member 90 is a slide shutter 80 which is shown in its open state and contains a passage opening 82.

The main body 71 is basically of cylindrical shape. An interior space 73 is formed inside the main body 71 which is delimited by a bottom portion 78 and a cylindrical sidewall 79. The sidewall 79 of the main body 71 forms the connector area for the source container 60. An outlet orifice 75 in the bottom portion 78 is located on the central longitudinal axis X of the main body 71 and of the entire dispensing head 50. The space from the outlet orifice 75 to the connector area for the source container 60 is open, so that when the dosage-dispensing unit 50 is in its operating state, dosage material can move from the source container 60 to the outlet orifice 75. The internal surface 77 of the bottom portion 78 which faces towards the interior space 73 of the main body 71 is designed with a curved contour and has a surface region in the shape of a circular arc R whose center M lies on the pivot axis Z of a holder device which is not shown in this drawing. The pivot axis Z defines the direction of movement V. The pivot axis Z is oriented orthogonal to the plane of the drawing at a distance S from the central longitudinal axis X of the dispensing head. The circular arc R extends from the central longitudinal axis X of the outlet orifice 75 towards the sidewall 79. Due to the fact that the pivot axis Z is arranged at the distance S from the central longitudinal axis X, the prescribed direction of movement V is oriented at a predetermined angle α relative to the central longitudinal axis of the outlet orifice. The predetermined angle α measured between the surface region of the arcuate line segment and the central longitudinal axis X is smaller than 90°.

As the internal surface 77 of the bottom portion 78 is designed with rotational symmetry relative to the central longitudinal axis X of the outlet orifice 75, the foregoing statement that the center M of the circle lies on the pivot axis Z applies only to a narrow surface region along a line segment of the internal surface 77. However, this is sufficient, as the dosage material starts to detach itself from the internal surface 77 along this line segment and pulls the material clinging to the adjacent wall portions with it.

The end surface 74 of the bottom portion 78 which faces away from the interior space 73 includes a raised border 76 encircling the outlet orifice 75. The slide shutter 80 is essentially a thin flat plate constrained to linear movement parallel to the end surface 74 by suitable guide means on the main body 71. The actuating member 90 includes a curve segment (not visible in FIG. 1), by means of which a rotary movement transmitted to the actuating member 90 is converted into a linear movement that is imparted to the slide shutter 80.

By means of the linear sliding movement of the slide shutter 80, the passage opening 82 of the latter can be brought to a variable degree of overlap with the outlet orifice 75, so that the aperture cross-section can be selected as a function of the angle of rotation of the actuating member 90 relative to the main body 71. Of course, the passage opening 82 can have any desired shape, for example triangular, square or oval. As already described in detail in U.S. Pat. No. 7,284,574 B2, the triangular shape is particularly well suited, as the aperture cross-section of the dispensing head 70 can be adjusted down to the diameter of an individual particle of the dosage material by moving the slide shutter 80 and its passage opening 82 in relation to the outlet orifice 75. Accordingly, this device is capable not only of delivering from the dosage-dispensing unit 50 a stream of dosage material at a variably selectable flow rate, but to dispense even individual particles. The passage opening 82 preferably has a sharp-edged rim 83 which is better able to cut up the string of substance as the latter, due to its inertia, is chopped into segments by the sharp-edged rim 83.

The dimensions of the actuating member 90 are matched in such a way to the thickness of the slide shutter 80 and the main body 71 that the slide shutter 80 is pushed with a slight compressive force against the raised border 76. To achieve a sufficiently tight seal between the source container 60 and the main body 71, a seal ring 69 can be either integrally formed or inserted in the interior space 73.

In FIGS. 1 and 4 to 6, the circular arc R is indicated by an arrow, whose arrowhead is pointing at the actual circular arc R. This representation serves to emphasize the connection that exists between the center M of the circle, which is arranged on the pivot axis Z, and the circular arc R. The length of the arrow identified as R therefore also equals the radius of the circular arc R.

Figure 2:
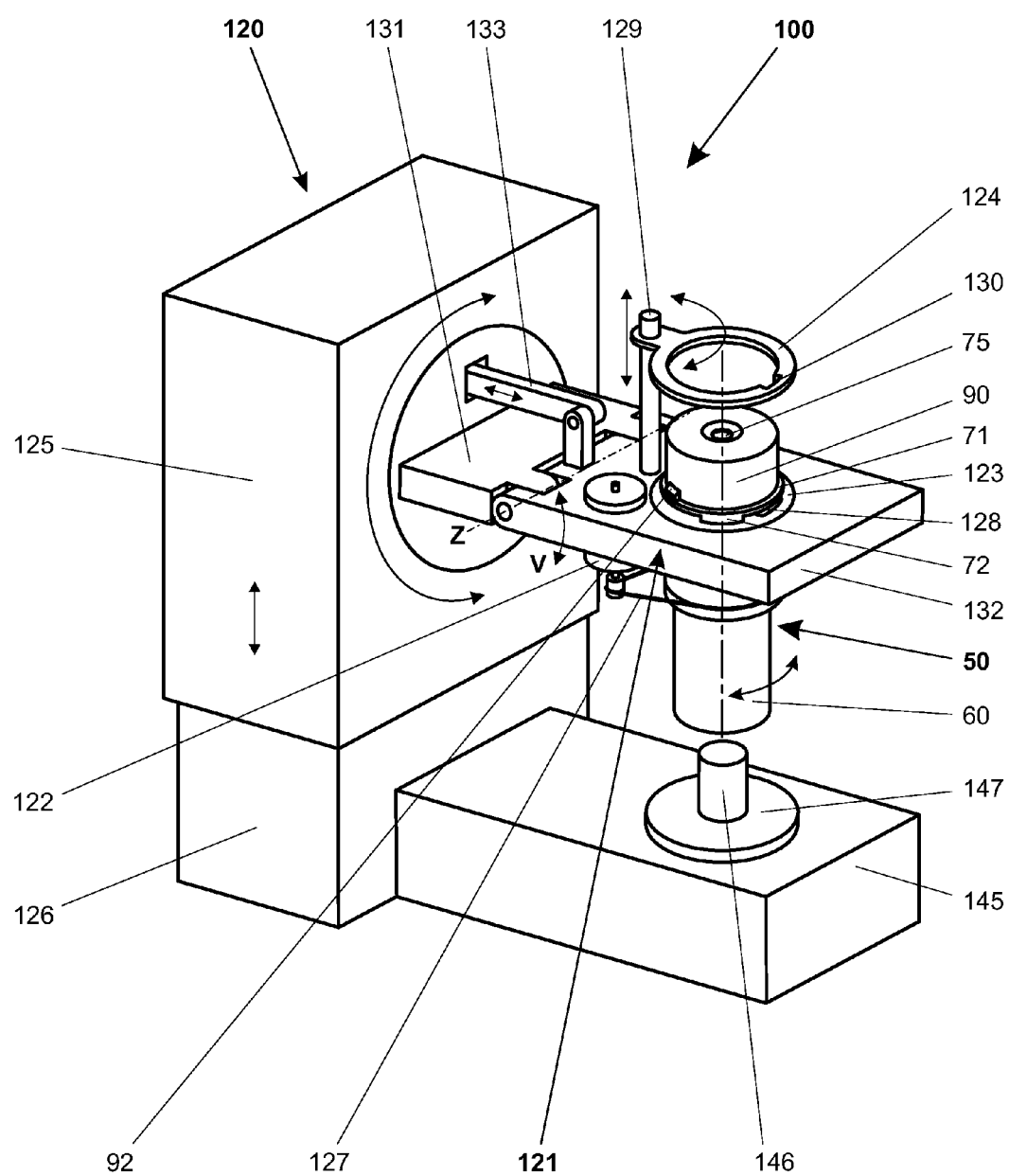
FIG. 2 is a schematic, three-dimensional view of a dosage-dispensing device with a holder device in which a dosage-dispensing unit according to FIG. 1 is installed.

FIG. 2 represents a schematic three-dimensional view of a dosage-dispensing device 100 with a dosage-dispensing unit 50, wherein the dosage-dispensing device 100 includes a holder device 121 and a drive mechanism 122 as well as a balance 145 with a weighing cell for the measurement of the mass of dosage material dispensed. The holder device 121 is subdivided into a support part 131 and a pivoting part 132, wherein the pivoting part 132 is connected to the support part 131 with the freedom to swivel about a horizontal pivot axis Z. The support part 131 is connected to a base unit 120 in such a way that it can turn about a horizontal axis of rotation. The pivoting movements in the prescribed direction of movement V are generated by a drive mechanism (not visible in this drawing) which is arranged inside the base unit 120 and are transmitted by a rod 133 to the pivoting part 132.

A first unit 123 is rotatably supported in the pivoting part 132 and connected by way of a belt drive 127 to a drive pulley of the drive mechanism 122, so that rotary movements can be transmitted. The first unit 123 has a first recess 128 which matches the shape of the first means 72. A second unit 124 is held by a guide post 129 that is rigidly connected to the pivoting part 132. As indicated by the double arrows, the second unit 124 has the freedom of linear sliding movement along the guide post 129 as well as rotary swivel movement about the guide post 129. Furthermore, the second unit 124 can also be locked in a fixed position on the guide post 129. The second unit 124 has a second recess 130, whose shape is matched to the second means 92.

The dosage-dispensing device 100 as shown in FIG. 2 is not in operating condition but in the setup phase. In the setup phase, the dosage-dispensing unit 50 is set into the holder device 121 which is oriented in its loading position as shown in the drawing, more specifically into an opening of the first unit 123. To complete the steps of getting the dosage-dispensing device 100 ready for operation, the ring-shaped second unit 124 is next swiveled into alignment with the dosage-dispensing unit 50 and pushed straight down along the guide post 129, until the actuating member 90 is embraced by the second unit 124 and the latter rests loosely on the second means 92. Now the second unit 124 can be turned until the first means 72 settles into the first recess 128 and the second means 92 into the second recess 130. Next, the second unit 124 is locked to the guide post 129 and the holder device 121 with the dosage-dispensing unit 50 is turned about a horizontal axis of rotation, so that the outlet orifice 75 is positioned immediately above the inlet opening of a target container 146. The target container 146 is standing on a load receiver 147 of the balance 145. Of course, before the dispensing process is started, the holder device 121 can be turned over any number of times or shaken by shock-like swivel movements in order to loosen up the dosage material. As is clearly apparent in FIG. 2, to open and close the dosage-dispensing unit 50, it is not the actuating member 90 that is being turned relative to the holder device 121, but rather the main body 71 with the source container 60.

In order to remove the dosage-dispensing unit 50 from the holder device 121 after the dispensing process, the foregoing steps are performed essentially in reverse order of sequence.

To allow target containers 146 of different heights to be used, the base unit 120 can be divided into a lower part 126 and an upper part 125, wherein the height is adjustable by vertically moving the upper part 125 relative to the lower part 126.

Figure 3:
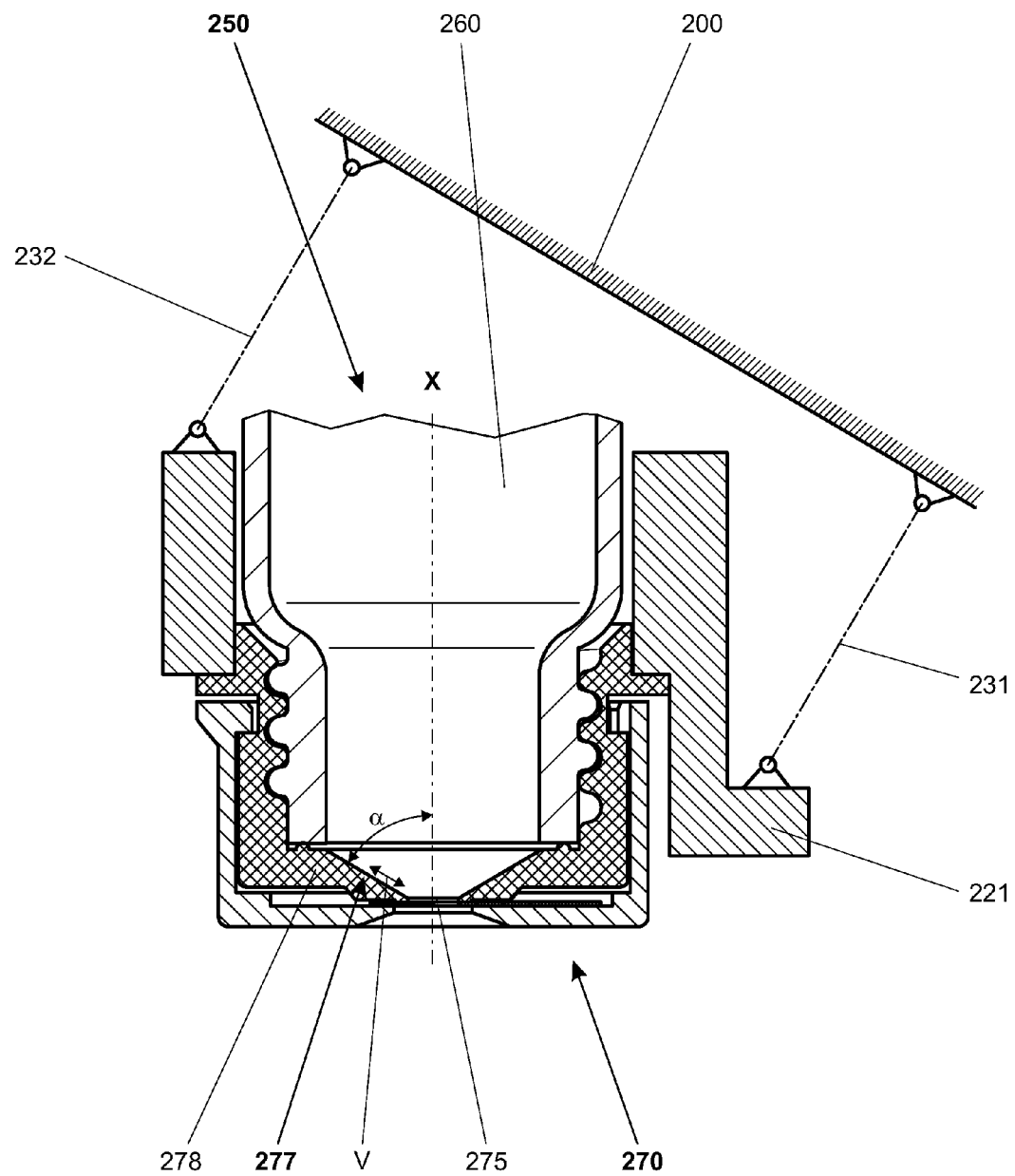
FIG. 3 is a sectional elevation drawing of a dosage-dispensing unit that includes a source container and a dispensing head, as well as a holder device that is guided in a linear movement by parallel guide members, wherein the line-segment surface region of the bottom portion of the dosage-dispensing unit is arranged to run parallel to the direction of the linear movement.

FIG. 3 shows a sectional elevation drawing of a dosage-dispensing unit 250, wherein the dosage-dispensing unit 250 has a source container 260 and a dispensing head 270. In its design, the dispensing head 270 is exactly equal to the dispensing head shown in FIG. 1, except for the one difference that the internal surface 277 of the bottom portion 278 in FIG. 3 is cone-shaped rather than curved and thus the surface region of at least one line segment, which appear in the drawing plane of FIG. 3, is a straight line segment. This straight line segment extends parallel to the direction of movement V of a holder device 221 which is guided in linear movement by means of the parallel guide members 231, 232. The holder device 221 and the parallel guide members 231, 232 are part of a dosage-dispensing device 200 which is only partially shown in the drawing. The parallel guide member 231, 232 have the same length, resulting in an essentially linear movement in the direction of movement V and at a predetermined angle α relative to the central longitudinal axis X of the outlet orifice 275. In this example, the predetermined angle α measured between the contour line segment and the central longitudinal axis is again smaller than 90°.

Of course, the two parallel guides 231, 232 can also have different lengths, in which case the prescribed direction of movement V is a swaying or rocking movement, and the internal surface of the bottom portion needs to be curved in a shape that matches this rocking movement.

Figure 4:
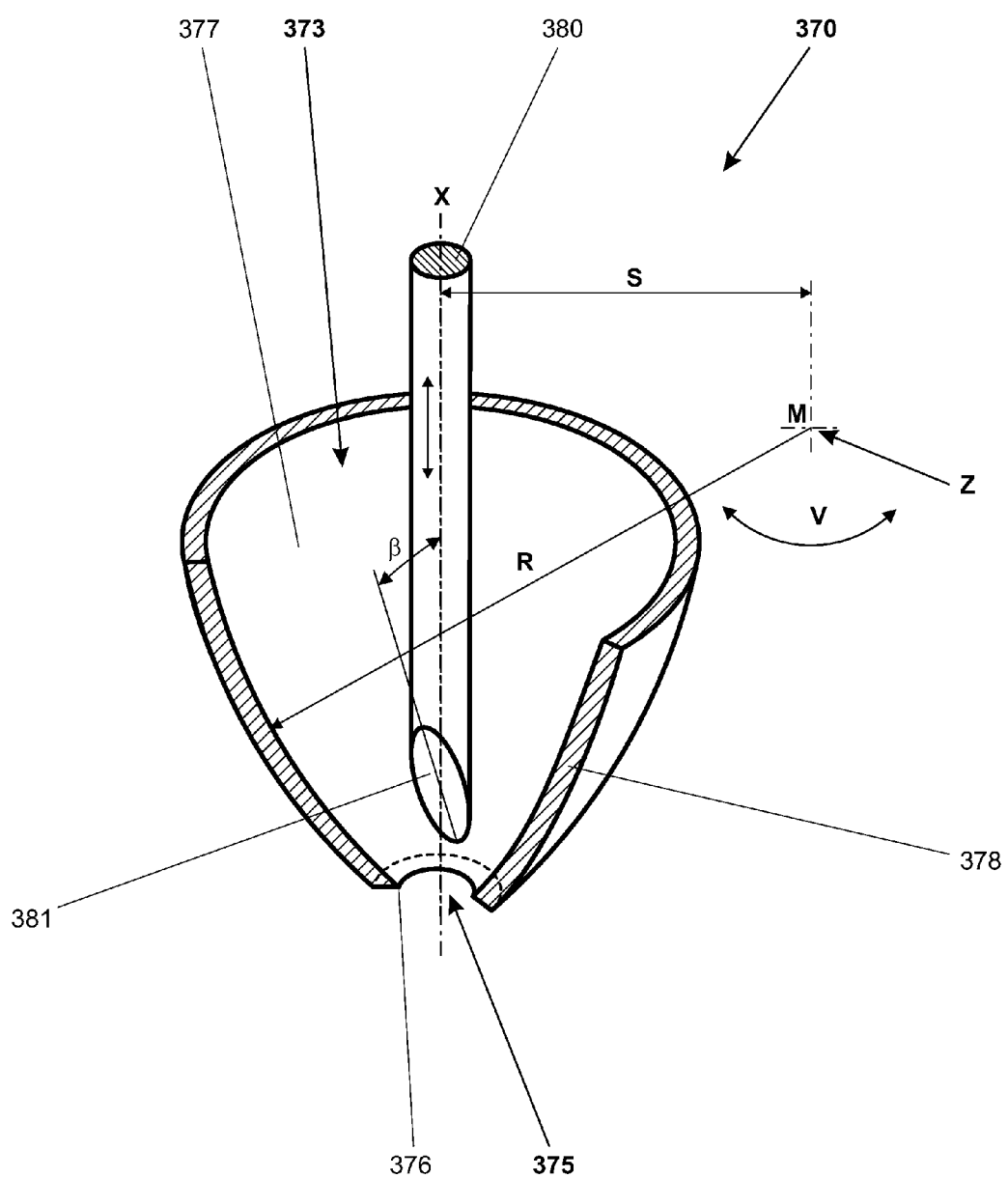
FIG. 4 is a schematic, three-dimensional view of the dispensing head of a dosage-dispensing unit with an outlet orifice and with a closure element that is constrained for guided movement along the central longitudinal axis of the outlet orifice, and with a continuous inside surface.

FIG. 4 shows a schematic, three-dimensional view of the dispensing head 370 of a dosage-dispensing unit with an outlet orifice 375 in a further embodiment. The outlet orifice 375 has a sharp-edged rim 376. This further embodiment is essentially analogous to the design that was already described in the context of FIG. 1. The design of the bottom portion 378 with a rotationally symmetric internal surface 377 is clearly apparent from FIG. 4. The center M of the circular arc R lies on the pivot axis Z which determines the direction of movement V and runs at a right angle to the central longitudinal axis X at a distance S from the latter. The circular arc R represents the generating curve of the internal surface 377 as a surface of revolution about the central longitudinal axis X of the dispensing head 370. Accordingly, only a narrow surface region consisting of one line segment of the internal surface 377 actually meets the spatial relationship to the pivot axis Z, although the internal surface 377 extends continuously from the circular arc R.

A closure element 380 is arranged in the interior space 373 of the dispensing head 370 on the central longitudinal axis X of the latter. With a linear displacement of the closure element 380 along the central longitudinal axis X, the outlet orifice 375 can be closed to a variable degree. To achieve this purpose, the end surface 381 of the closure element 380 is inclined at an angle β relative to the central longitudinal axis X. Of course, the end surface 381 of the closure element 380 or the closure element 380 itself can also be designed in other ways. Possible configurations are disclosed for example in EP 1 931 950 A1, EP 1 931 951 A1, and EP 1 931 953 A1.

Figure 5:
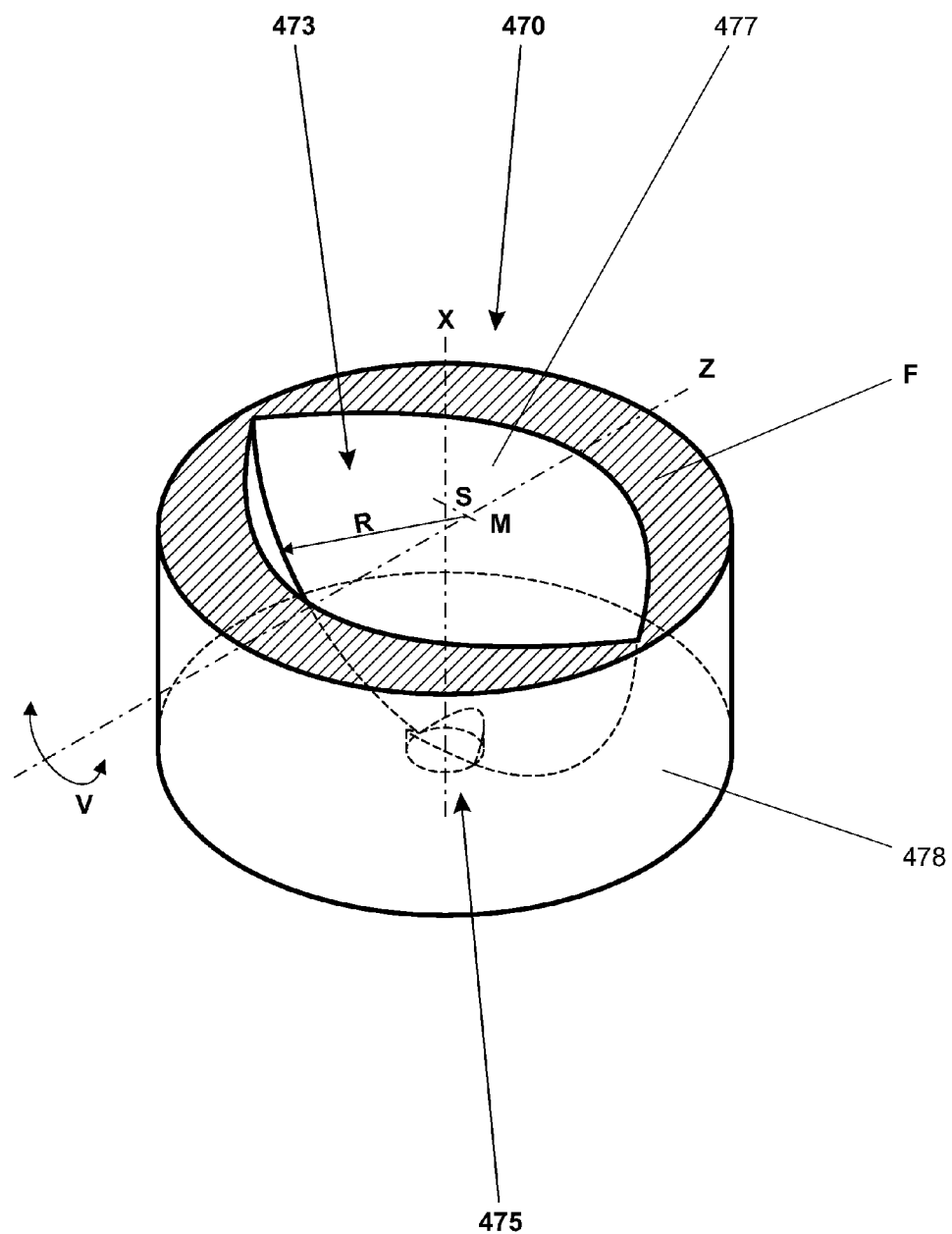
FIG. 5 is a schematic, three-dimensional view of the dispensing head of a dosage-dispensing unit with an outlet orifice and with a discontinuous inside surface.

FIG. 5 is a schematic three-dimensional illustration of a dispensing head 470 of a dosage-dispensing unit with an outlet orifice 475 in a further embodiment. In the interest of clarity, a closure element has been omitted from this drawing. As in the embodiments described previously, the interior space 473 of the dispensing head 470 is delimited by a sidewall and a bottom portion 478. In FIG. 5, the horizontal section plane F lies at the transition from the sidewall to the bottom portion 478, and the sidewall is therefore not shown in this drawing. The center M of the circular arc R lies on the pivot axis Z which determines the direction of movement V and which runs at a right angle to the central longitudinal axis X a distance S from the latter. The internal surface 477 of the bottom portion 478 is non-continuous, having a discontinuity at the circular arc R.

Figure 6:
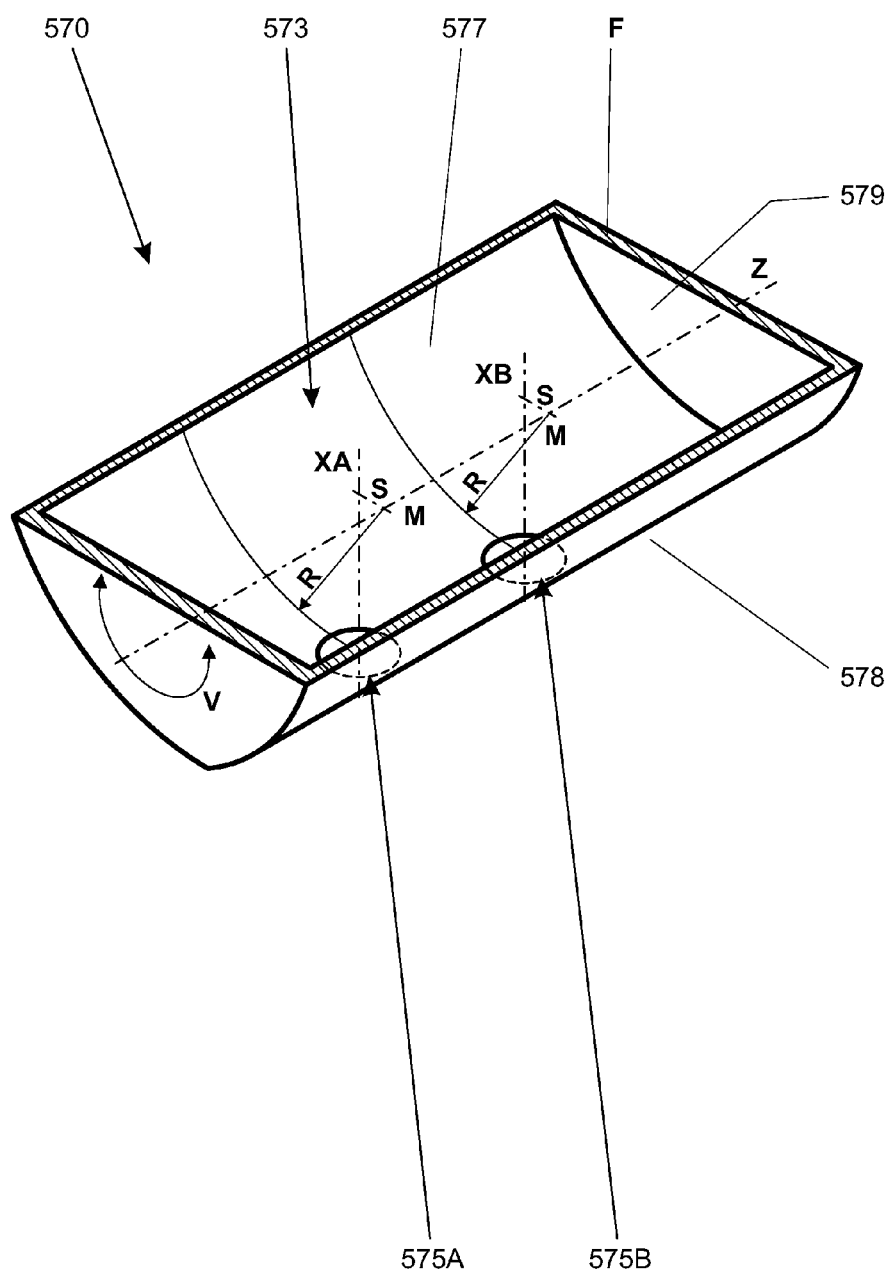
FIG. 6 is a schematic, three-dimensional view of the dispensing head of a dosage-dispensing unit with two outlet orifices.

FIG. 6 shows a schematic three-dimensional view of the dispensing head 570 in a further embodiment of a dosage-dispensing unit with two outlet orifices 575A, 575B. In the interest of clarity, closure elements have been omitted from the drawing. As in the embodiments of the foregoing description, the interior space 573 of the dispensing head 570 is delimited by a sidewall 579 and a bottom portion 578. The transition from the sidewall 579 to the bottom portion 578 lies partially in the horizontal section plane F. The horizontal pivot axis Z also lies in the section plane F. Unlike the preceding examples, the internal surface 577 of the bottom portion 578 is configured as a channel, so that there is not only one circular line segment with a center M on the pivot axis Z, but the center of curvature M of any section along the entire channel lies on the pivot axis Z, i.e. every point of the internal surface 577 lies on a circular arc R whose center M lies on the pivot axis Z. As is evident from FIG. 6, the central longitudinal axes XA XB of the outlet orifices 575A, 575B are located at identical distances S from the pivot axis Z which defines the direction of movement V. Of course, arrangements with more than two outlet orifices 575A, 575B are also possible which can be opened and closed independently of each other or synchronously by closure elements.

Although the invention has been described by presenting specific embodiments, it is evident that numerous further variant embodiments could be created based on the teachings of the present invention, for example by combining the features of the individual embodiments with each other and/or be exchanging individual functional units between embodiments. For example, the discontinuous internal surface disclosed in FIG. 5 could also be used in a dispensing head with several outlet orifices as disclosed in FIG. 6. Furthermore, the closure elements such as for example the slide shutter of FIG. 1 and the closure element of FIG. 4 can be employed in all of the embodiments. Accordingly, such combinations and alternative solutions are considered to be part of the invention.

What is claimed is:

1. A unit for dispensing a dosage of a material contained in a source container, for use with a dosage-dispensing device having a holder device that holds the dosage-dispensing unit and the source container, the holder device being supported by constraints that allow movement in a prescribed direction, the dosage-dispensing unit comprising:
a cylindrical sidewall, adapted on an interior surface for releasably connecting the source container;
a bottom portion, which, together with the sidewall, delimits an interior space;
an outlet orifice, formed in the bottom portion and having a central longitudinal axis that is oriented at a predetermined angle relative to the prescribed direction of movement; and
a surface region, formed on an internal surface of the bottom portion that faces the interior space, the surface region comprising a circular arc extending from the central longitudinal axis towards the sidewall, with a center of the circular arc arranged at a perpendicular distance from the central longitudinal axis, so that the predetermined angle, as measured between the circular arc and the central longitudinal axis is smaller than 90°.

2. The dosage-dispensing unit of claim 1, wherein:
the center of the circular arc lies on a horizontal pivot axis defined when the dosage-dispensing unit is connected to the holder device and the prescribed direction of movement of the holder device is a pivoting movement.

3. The dosage-dispensing unit of claim 1, wherein:
a radius of curvature of the circular arc differs by no more than ±10% from a radius of the pivoting movement in the surface region of the circular arc.

4. The dosage-dispensing unit of claim 1, further comprising:
a further outlet orifice formed in the bottom portion; and
a further surface region, formed on the internal surface of the bottom portion, the further surface region comprising at least a line segment that starts at the further outlet orifice and extends along the prescribed direction of movement.

5. The dosage-dispensing unit of claim 1, wherein:
the outlet orifice comprises a rim having a sharp edge.

6. The dosage-dispensing unit of claim 1, wherein the outlet orifice has a triangular, square or round aperture cross-section.

7. The dosage-dispensing unit of claim 6, further comprising:
a slide shutter, arranged to close off the aperture cross-section of the outlet orifice to a variable extent.

8. The dosage-dispensing unit of claim 7, wherein:
the slide shutter is arranged to slide at a right angle to the central longitudinal axis of the outlet orifice and has a straight, sickle-shaped or V-shaped shutter edge or a triangular, square or round passage opening.

9. The dosage-dispensing unit of claim 8, wherein:
the passage opening has a cutting edge.

10. The dosage-dispensing unit of claim 6, further comprising:
a closure element, guided in linear movement along the central longitudinal axis of the outlet orifice, to close off the aperture cross-section of the outlet orifice to a variable degree.

11. The dosage-dispensing unit of claim 1, wherein:
the bottom portion has a continuous surface profile, starting from the surface region.

12. The dosage-dispensing unit of claim 2, wherein:
the bottom portion has a discontinuous surface profile, starting from the surface region.

13. A device for dispensing a dosage of a material, comprising:
a unit according to claim 1 for dispensing the dosage;
a holder device adapted to receive the dosage-dispensing unit; and
means for supporting the holder device while constraining the holder device to movement in a prescribed direction, the movement occurring at a predetermined angle relative to the central longitudinal axis of the outlet orifice and along a surface region of the internal surface of the bottom portion that faces towards the interior space, the surface region comprising at least a line segment that starts at the central longitudinal axis and extends to the sidewall, with the predetermined angle, as measured between the line segment and the central longitudinal axis, being smaller than 90°.

14. The dosage-dispensing device of claim 13, further comprising:
an impact mechanism, arranged to generate oscillating movements of the holder device in the prescribed direction of movement.

15. The dosage-dispensing device of claim 14, wherein:
the supporting means allows rotation of the holder device about a horizontally-oriented axis.

16. The dosage-dispensing device of claim 13, wherein:
the supporting means allows rotation of the holder device about a horizontally-oriented axis.

* * * * *